Patented Oct. 9, 1945

2,386,674

UNITED STATES PATENT OFFICE 2,386,674

PULVERULENT MATERIALS AND DISPERSIONS PRODUCED THENCE

Colin Falconer Flint and Robert Bertram Fisher Frank Clarke, Blackley, Manchester, England, assignors to Imperial Chemical Industries Limited, a corporation of Great Britain No Drawing. Application August 19, 1941, Serial No. 407,510. In Great Britain January 2, 1940

2 Claims. (Cl. 260—32)

The present invention relates to pulverulent materials and more particularly to the production of pulverulent polythenes, that is to say, polythenes in friable or powder form, and to the production of aqueous dispersions of polythenes from the said pulverulent polythenes. The name polythene has been given (see British specification No. 514,687) to solid polymers of ethylene. The present invention, however, is only concerned with those polythenes that have at atmospheric temperatures a horny consistency. These will be hereafter referred to as "horny polythenes."

It is known from British specification No. 471,590 that some polythenes can be obtained in the form of a white powder. This invention is concerned with the conversion, in an industrially simple manner, of horny polythenes into a pulverulent condition, and thence into an aqueous dispersion.

According to the invention we heat a horny polythene with or without addition of a small proportion of oleaginous material or other modifying agent, to temperatures as defined below, and work it into a plastic or mouldable mass and continue this working, if necessary at a lower temperature, until the material becomes pulverulent. There is thus obtained a friable material or agglomerate which may fall readily into a powder or which is readily broken down to a powder.

According to a further feature of the invention we make aqueous dispersions of horny polythenes by bringing together in any order the pulverulent or friable material with water and a dispersing agent. We may add a dispersing agent as such to a mixture of pulverulent polythene and water; or we may add the pulverulent polythene to an aqueous solution of dispersing agent; or, by taking a pulverulent polythene made as described above which contains a small proportion of a soap-forming fatty acid as oleaginous material and using an aqueous solution of suitable alkali, we may form the dispersing agent in situ, or the dispersing agent may be added at an earlier stage so as to be already present in the pulverulent material.

In working according to the invention it is necessary to heat the horny polythene to at least about 60° C. This minimum temperature may vary to a small extent with the physical properties of the particular sample of horny polythene employed. If the polythene is worked at too low a temperature it may form flakes or a mass of agglomerated coarse particles but will fail to attain that pulverulent condition in which the particles are finely divided. Such material will not yield a satisfactory dispersion and is unsuited to the purposes of this invention. The horny polythene may be heated to higher temperatures and worked but at about 80° C. or above it becomes necessary to cool the material and continue the working in order to render it pulverulent. At about 100–120° C. the polythene exhibits incipient fusion. It is convenient to heat it to this stage when it is wished to incorporate modifying agents especially those which are not liquid at ordinary temperatures. But the polythene must not be allowed to remain unduly long at such a temperature because it tends to become scorched and deteriorate. For this reason it is undesirable to heat the horny polythene above about 120° C. for long. Moreover should the polythene be worked above about 100° C. on a machine which can only be cooled slowly, e. g. a heavy two-roll rubber mill, it may be essential to remove the polythene from the mill and cool it separately and quickly, to avoid scorching.

As oleaginous materials or other modifying agents there come into consideration soap-forming fatty acids, other substances of an oily or greasy nature, e. g. mineral oils of the lubricating oil category, unvulcanized natural and artificial rubbers or rubbery material, e. g. polyisobutylene (of mol. wt. approx. 80,000) and those high polymers of vinyl alcohols and of acrylate and methacrylate esters, which soften at, for example, 90–120° C. In some cases we have found that the conversion of the horny polythene into a dispersion is facilitated by adding a small quantity of rubbery material such as raw natural rubber, raw neoprene or polyisobutylene (mol. wt. approx. 80,000). Such additions render the resulting dispersions more fluid for a given solid content. The presence of ammonium polymethacrylate we have also found assist in the formation of a fine polythene dispersion. Additions of the said oleaginous materials or other modifying agents may be made at any stage in the treatment of the polythene according to the present invention.

As dispersing agents we may use compounds such as, for example, sodium silicate, condensation products of ethylene oxide with cetyl or oleyl alcohol, or soaps.

In respect of aqueous dispersions made by the process of the invention, we may modify their properties by adding fillers, pigments, plasticizers and the like. These additions may be made to the finished aqueous dispersion or they may be made to the polythene whilst it is being converted into the pulverulent form, or they may be made at other stages in the treatment of the polythene.

As machines suitable for working the horny polythenes, there come into consideration rubber mills, Werner-Pfleiderer, Banbury and other mixing or dough-working appliances. The machines must be strong enough to carry out the operations and be provided with means for heating the horny polythene to the desired temperature.

We may conduct the processes of plastic working and dispersion consecutively in the same machine without removing the material at any stage; in other cases, the procedure, depending on the particular mixing machine used, may be varied in that the material is conveniently transferred from one machine to another at any stage of the treatment.

The aqueous dispersions of the invention have consistencies ranging from mobile liquids to thick pastes.

The aqueous dispersions of polythene of the present invention may be applied to textile or other materials. The materials may be coated or, when porous, impregnated with the dispersions by spreading, spraying or immersion. Thus textile fabrics may be coated by spreading with a blade, bar, roller or brush or by spraying. Porous materials, for example, fibrous masses such as asbestos, may be impregnated by immersion in the dispersions. Coatings or deposits consisting of or containing polythene may then be obtained by drying the applied dispersions, preferably at a temperature just below 100° C. In order to remove as much as possible of the water-soluble dispersing agents which might detract from the water resistance and mechanical strength of the polythene coatings or deposits, it may be necessary to wash or soak the dried material or article in hot water. The coating or deposit may be consolidated by heating and pressing at a temperatre above the softening point of polythene in order to fuse the polythene particles firmly together. An external coating or deposit of the polythene may thus be forced into or through a fabric or other porous foundation to give a kind of impregnation.

The above polythene coatings or deposits are highly resistant to exposure to air, water, acids, alkalies, war gases, oils, and are unaffected by solvents, fats and greases, being non-swelling. They are also impervious to gases, e. g. lifting gases used in balloons and airships. They possess high electrical resistivity. Fabric so treated is of value for electrical insulating purposes, e. g. for use as wrapping tapes or non-conductive clothing. Moreover the said polythene deposits when applied in sufficient quantity by coating or impregnating textile fabrics with the dispersions and drying, impart stiffness and non-creasing properties thereto. Such fabrics may be embossed.

The present polythene dispersions may be used as adhesives, e. g. for doubling fabrics by bringing together the surfaces to be united with a layer of dispersion interposed and drying. Another method depending on the thermoplastic nature of polythene is merely to bring two polythene-coated surfaces together and then apply pressure and heat. On cooling, a firm bond is obtained.

Polythene dispersions may also be shaped or deposited on surfaces by coagulation, using known coagulating or setting agents appropriate to the dispersion in question. The coagulant may be applied to the surface prior to treatment with the polythene dispersion or may be applied to the coating or deposit of the polythene after the coating has been applied. An advantage of coagulating is that the water present in the dispersion may be drained away which facilitates the drying.

Fabrics which have been covered, impregnated, doubled or united in multiple plies by the aid of polythene applied as an aqueous dispersion may be used for multifarious purposes, including the provision of, for example: book cloth, balloon fabric, shoe foundations and socking, petrol pump diaphragms, petrol bags (e. g. for aircraft), fabricated hose for oils, petrol and solvents, gas bags, hat bands, umbrella covers, foundations and stiffenings for garments, stiff and semi-stiff shirt collars, machine-gun belting, conveyor belt covering for greasy or oily substances, caulking strips and compositions, diaphragm valves for solvent and chemical plant, protective clothing (e. g. against oils, solvents, war gases), tenting, hooding, leather cloth, floor coverings, upholstery, liners for use in rubber factories, tracing cloth, linings for bags, cartons, drums, kegs, paper or cardboard oil and other containers, linings for pipes, pans and other chemical vessels, rollers, pads and blankets for printing and kindred industries, felt, roller blinds, waterproof fabrics (e. g. for bathroom curtains), and fabrics having glace, stiff, transparent novelty effects.

The present aqueous dispersions of polythene may also be used as binding agents in various ways. Shaped articles may be made from fibres, e. g. textile, wood or asbestos fibres, by adding the polythene dispersion to a slurry of the fibres and causing the fibres to deposit together with the polythene, or from granules, e. g. of cork. New compositions can be formed in this way, e. g. cork/polythene compositions for gaskets, etc. (e. g. for use in dry-cleaning and other plant handling solvents), asbestos/polythene compositions for gaskets, packings, etc. and textile fibre/polythene packings.

Films, tapes or ribbons can be prepared by applying the present polythene dispersions to a suitable, e. g. metallic surface (that may carry ridges or grooves or a raised or engraved design and may consist of a rotating cylinder or endless belt) drying and then before stripping from the surface preferably washing and consolidating by heat. The dispersion may be applied by spreading, spraying or by arranging for the moving surface to be immersed for part of its travel, in a bath of the dispersion.

Threads of polythene or polythene compositions may be prepared from the present aqueous dispersions by selecting suitable known processes already applied to rubber latex, e. g. causing the dispersion to stream through a fine aperture into a coagulant, washing and drying the product.

Wires, cables, rope, cords and other articles in continuous lengths may be covered with polythene compositions by passing the article to be coated through a bath of the present polythene aqueous dispersions, arranging for the article to emerge vertically from the bath and drying (or substantially drying to set the deposit) while the article is still vertical in order to secure accurate centering. If desired, a die may be used to shape the deposit around the article or remove excess of the dispersion. This process may be used for manufacturing electrically insulated wires or cables and for protecting ropes and cordage against exposure to weather, fresh water or seawater.

The following examples in which the parts are by weight illustrate but do not limit the invention.

*Example 1*

400 parts of horny polythene of softening point below 110° C. in lumps or slabs are milled on a rubber mill provided with means for heating and cooling the rolls, the rolls being heated to 110° C. The polythene is worked until it runs smoothly, the nip being small, that is to say, the rolls being near together, so that the bulk of the polythene forms a changing semi-fluid mass on the entering side of the nip. 80 parts of oleic acid are then added slowly and the mass is worked until it is visibly homogeneous. Cold water is then circulated through the rolls and milling is continued as cooling proceeds until the mass breaks down. It becomes pulverulent, falling off in powder and loose cake. The material so obtained consists then of particles, and is easily transformed into a powder by gentle crushing and when necessary sieving.

*Example 2*

The procedure of Example 1 is followed up to the stage when the rolls are cold and the pulverulent material is about to fall away. There is then added to the moving mass, 96 parts of aqueous sodium silicate (commercial waterglass). The loosely aggregated powder state persists. Material dropping from the rolls is returned at odd stages as necessary. Cold water is added in small quantities. The working is continued, and mixing is accelerated by continually opening and closing the nip. When a smooth paste of the consistency of cream is obtained the operation is brought to an end. There is thus obtained a cream-like stable aqueous dispersion.

*Example 3*

The procedure of Example 2 is carried out until the sodium silicate has been added. 40 parts of lubricating oil, e. g. that sold under the trade name Mobiloil BB, are then added to the material on the rolls and working is continued until the mass is homogeneous. Cold water is now added as described in Example 2, until a paste of creamy consistency is obtained.

*Example 4*

The procedure of Example 2 is followed until the stage at which a smooth paste of the consistency of cream is obtained, the quantities of the various materials used being as follows:

| | Parts |
|---|---|
| Horny polythene | 100 |
| Oleic acid | 10 |
| Water glass | 20 |
| Water | 164 |

The smooth paste is then treated by passing it through the machine used for homogenising pastes and emulsions known as the Hurrell Homogeniser.

A product, so obtained, was examined under the microscope. It was observed that the particles varied in size between 0.3 and 12 microns, the majority by number falling within the size range of 0.3 to 0.5 micron.

*Example 5*

The procedure of Example 1 is followed up to the stage at which the bulk of the polythene forms a changing semi-fluid mass on the entering side of the nip. No oleic acid is added. Cooling water is now circulated while milling is continued and the rest of the procedure of Example 1 is followed until the mass becomes pulverulent.

The pulverulent mass is crushed in a mechanical mortar and pestle, and passed through a sieve containing 100 wires to the linear inch. A fine uniform powder is thus obtained.

This fine powder is mixed with one tenth of its weight of liquid paraffin (medicinal grade) and with its own weight of a 15% solution of neoprene in benzene. There is thus obtained a dough-like mass that may be spread upon fabric to give, after evaporation of the solvent, a smooth, dry, flexible coating.

As indicated in the fifth example the pulverulent polythene may be mixed with other materials to give compositions suitable for coating purposes.

Also the aqueous dispersions, for instance those of Examples 2, 3 and 4, may be mixed with other emulsions and dispersions. There come into consideration here especially rubber latex, latices of synthetic rubber-like substances, and emulsions and dispersions of water-insoluble high polymers, e. g. of vinyl esters, acrylic and methacrylic esters and the like.

*Example 6*

100 parts of horny polythene are milled on a rubber mill at about 110° C. The polythene is worked until it runs smoothly as a plastic or mouldable mass. 10 parts of oleic acid are added slowly and worked into the mass. The mill is cooled and milling continued as cooling proceeds until the mass becomes pulverulent. 10 parts of the condensation product of ethylene oxide (17 mols.) with cetyl alcohol (1 mol.) are then incorporated in the pulverulent polythene. Water is added, with continued working, until a paste of the desired consistency is obtained. The product is a stable dispersion of polythene of particle size similar to that of Example 4.

The addition of sufficient aqueous ammonia with the water to make the rolls smell of ammonia, assists in securing a fine dispersion.

Whereas the deposits made by applying the product of Example 2, 3 or 4 to the fabric, drying and then consolidating by heating to fuse the polythene and applying pressure, need to be extracted with water, preferably before the consolidation process, to make them water-resistant, the deposits made from the product of the present example are already water-resistant after consolidation without any water-extraction.

*Example 7*

100 parts of horny polythene are milled on a cold rubber mill till flakes are formed. 95 parts of these flakes are then worked cold on a small rubber mill with 5 parts of polyisobutylene (mol. wt. approx. 80,000) until the mixture, which is in the form of a sheet, appears nearly homogeneous.

The mill is then heated to about 110° C. and the said sheets further worked until a homogeneous plastic mass is formed. 4.5 parts of oleic acid are incorporated and working continued, the mill being cooled, until the mass is friable. 4.5 parts of the condensation product of Example 6 are then worked into the mass followed by a small quantity of water. The material is now more coherent and forms an opaque white sheet.

The sheet is removed to a Baker-Perkins mixing machine and worked cold. 10 parts of 10% aqueous ammonium polymethacrylate are added, followed by successive small quantities of water until a paste of the desired consistency is obtained. Ammonium polymethacrylate improves the spreading properties of the dispersions on fabric, preventing water from readily filtering away into the fabric when they are applied.

To the above paste there may be added by stirring 25 parts of ethylene glycol. This prevents the dispersion drying and forming troublesome skins or crusts on the surface on exposure to the atmosphere, for example, when used for treating textiles.

Example 8

100 parts of horny polythene are milled on a rubber mill at 110° C. The polythene is worked until it runs smoothly and forms a plastic or mouldable mass. 10 parts of the condensation product made from ethylene oxide (30 mols.) and oleyl alcohol (1 mol.) are added slowly and worked into the mass. The mill is cooled and milling continued as cooling proceeds until the mass becomes pulverulent. Water is added with continued washing, until a paste of the desired consistency is obtained. A polythene dispersion of good quality is produced. This dispersion, like the products of Examples 6 and 7, affords water-resistant deposits on textiles without the necessity for water-extraction.

Example 9

85 parts of horny polythene and 15 parts of polyisobutylene (mol. wt. approx. 80,000) are mixed cold in a Werner-Pfleiderer machine. The machine is then heated with 40 lb./sq. in. steam in the jacket and mixing continued. When a homogeneous plastic mass has been formed, 4.5 parts of oleic acid are slowly poured in. After thorough mixing, the steam is turned off and the machine cooled by the circulation of cold water. When the mass, previously completely plastic, shows signs of cracks during the working, 4.5 parts of the condensation product of Example 6 are added. The cooling water is now turned off and 100 parts of water added very slowly. The material passes through the pulverulent stage and forms a stiff paste as the water is thoroughly mixed in and followed by 10 parts of a 12% aqueous solution of ammonium polymethacrylate. The product may be further diluted by stirring with water and, if desired, homogenised in a suitable machine such as a cone mill or colloid mill.

Instead of the 15 parts of polyisobutylene one may use an equal weight of raw rubber or raw neoprene.

Example 10

85 parts of polythene are mixed cold with 15 parts of polyisobutylene on a large rubber mill, in the manner described in Example 7, to form sheets.

The above sheets are fused by working and heating the mill to about 110° C. 4.5 parts of oleic acid are incorporated and working continued until a homogeneous plastic mass has been made. The material is then removed from the mill and set aside to cool. When the mill has been cooled to about 70° C., the material is worked on it again at this temperature and 4.5 parts of the condensation product of Example 6 are added, followed by sufficient water in small successive additions, to render the mass soft enough to handle in a Baker-Perkins dough mixer. The material, on being worked at 70° C., at first breaks up into flakes, but afterwards hangs together as a continuous sheet and becomes friable and forms a white, soft, opaque mass as the condensation product and water are added. The material is then transferred to a Baker-Perkins dough mixer. 10 parts of 12% aqueous ammonium polymethacrylate and sufficient water to give a paste of the desired consistency are incorporated. Some of the water may, if wished, be added before the ammonium polymethacrylate.

Example 11

100 parts of horny polythene are milled on a large rubber mill at 120° C. and 10 parts of oleic acid then incorporated. The material is removed from the rolls and allowed to cool. When cold it is returned to the mill of which the rolls have been cooled to about 70° C. The material forms a pulverulent mass which breaks down into a fine powder. 10.0 parts of the condensation product of Example 6 are now added, followed by 100 parts of water and 10 parts of 12% aqueous ammonium polymethacrylate. A fine dispersion is produced.

Example 12

The procedure of Example 7 is followed until the condensation product has been added. 10 parts of water are then incorporated, followed by 25 parts of ethylene glycol, added in small quantities. Finally 10 parts of a 12% solution of ammonium polymethacrylate are mixed in. The product is a very stiff paste that does not dry, or show any superficial hardening on exposure to the atmosphere. It can readily be kept in, e. g. cardboard or wooden boxes. When required for use for treating textiles water can be stirred into the paste, as needed, to give a very fine dispersion of the solid content or consistency desired.

We claim:

1. In a process for producing aqueous dispersions of polymers of ethylene, the steps which comprise heating polymers of ethylene of horny consistency to temperatures of at least 60° C., working the resultant material into a plastic mass in the presence of from 5 to 15% of polyisobutylene, thereafter continuing the working until the mass becomes pulverulent, bringing together the resultant pulverulent polymer with water and a dispersing agent and thereafter agitating the resultant mixture to form a dispersion.

2. An aqueous dispersion of polymers of ethylene of horny consistency and polyisobutylene, there being present from 5 to 15 parts by weight of polyisobutylene per 100 parts of the total weight of polymers of ethylene and polyisobutylene.

COLIN FALCONER FLINT.
ROBERT BERTRAM FISHER
FRANK CLARKE.